United States Patent
Hong

(10) Patent No.: US 7,768,592 B2
(45) Date of Patent: Aug. 3, 2010

(54) BACKLIGHT UNIT COMPRISING DIFFUSION PLATE WITH OPENING PORTION HAVING A DISCONNECTED RING SHAPE AND LIQUID CRYSTAL DISPLAY DEVICE INCLUDING THE SAME

(75) Inventor: Hyung Ki Hong, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 168 days.

(21) Appl. No.: 11/967,656

(22) Filed: Dec. 31, 2007

(65) Prior Publication Data

US 2008/0309846 A1  Dec. 18, 2008

(30) Foreign Application Priority Data

Jun. 12, 2007  (KR) ...................... 10-2007-0057021

(51) Int. Cl.
- *G09F 13/04* (2006.01)
- *G09F 13/08* (2006.01)
- *G02F 1/1335* (2006.01)

(52) U.S. Cl. ........................ 349/64; 362/97.2; 362/97.3

(58) Field of Classification Search ................... 349/64; 362/97.2, 97.3

See application file for complete search history.

(56) References Cited

U.S. PATENT DOCUMENTS

| | | | | |
|---|---|---|---|---|
| 5,954,423 A | * | 9/1999 | Logan et al. | 362/235 |
| 2005/0088586 A1 | * | 4/2005 | Mori et al. | 349/62 |
| 2005/0219836 A1 | * | 10/2005 | Hung | 362/97 |
| 2006/0092346 A1 | * | 5/2006 | Moon et al. | 349/61 |

* cited by examiner

*Primary Examiner*—Andrew Schechter
*Assistant Examiner*—Michael Inadomi
(74) *Attorney, Agent, or Firm*—Brinks Hofer Gilson & Lione

(57) ABSTRACT

A backlight unit includes at least one light emitting diode; and a diffusion plate over the at least one light emitting diode and including at least one opening portion corresponding to the at least one light emitting diode, wherein the at least one opening portion has a disconnected ring shape, and the diffusion plate further includes a first portion directly above the at least one light emitting diode and surrounded by the at least one opening portion, a second portion surrounding the at least one opening portion, and a third portion coupling the first and second portions.

10 Claims, 4 Drawing Sheets

BACKLIGHT UNIT COMPRISING DIFFUSION PLATE WITH OPENING PORTION HAVING A DISCONNECTED RING SHAPE AND LIQUID CRYSTAL DISPLAY DEVICE INCLUDING THE SAME

CLAIM FOR PRIORITY

The present invention claims the benefit of Korean Patent Application No. 2007-0057021, filed in Korea on Jun. 12, 2007, which is hereby incorporated by reference in its entirety.

TECHNICAL FIELD

The present application relates to a backlight unit and a liquid crystal display device including the same.

BACKGROUND

Display devices have typically used cathode-ray tubes (CRT). Presently, much effort has been made to study and develop various types of flat panel displays, such as liquid crystal display (LCD) devices, plasma display panels (PDP), field emission displays, and electro-luminescence displays (ELD), as a substitute for the CRT. LCD devices have advantages over the other flat panel displays, some of the advantages are high resolution, light weight, thin profile, compact size, and low power supply requirements.

In general, an LCD device includes two substrates that are spaced apart and face each other with a liquid crystal material interposed between the two substrates. The two substrates include electrodes that face each other. A voltage applied between the electrodes induces an electric field across the liquid crystal material. Alignment of the liquid crystal molecules in the liquid crystal material changes in accordance with the intensity of the induced electric field, thereby changing the light transmissivity of the LCD device. Thus, the LCD device displays images by varying the intensity of the induced electric field.

Because the LCD device is a non-emissive type display device, a backlight is needed to supply the non-emissive type display device with light. A CCFL (cold cathode fluorescent lamp) or an EEFL (external electrode fluorescent lamp) has been previously used. Recently, a LED (light emitting diode) is used because it has small size, low power consumption and high reliability.

FIG. 1 is an exploded perspective view illustrating an LCD device according to the related art.

Referring to FIGS. 1 and 2, in the related art LCD device, a backlight unit 30 and a liquid crystal panel 10 are sequentially disposed over a bottom case 50. A main supporter 40 has a rectangular frame shape and supports the backlight unit 30 and the liquid crystal panel 10. The main supporter 40 is combined with the bottom case 50.

A driving circuit is connected to the liquid crystal panel 10 through a FPC (flexible printed circuit) film 12. A top case 60 is disposed on the top of the liquid crystal panel 10. The top case 60 has a rectangular frame shape. The top case 60 presses and fixes a peripheral portion of the liquid crystal panel 10 and is combined with the main supporter 40 and the bottom case 50.

The backlight unit 30 includes a plurality of LEDs 33, a reflection sheet 34, a diffusion plate 36, and optical sheets 38 such as a prism sheet and a diffusion sheet. The LEDs 33 are arranged on a plurality of MCPCBs (metal core printed circuit boards) 32. The MCPCBs 32 are arranged in parallel on the bottom case 50 and are connected through a conductive line 39 to be supplied with a power for the LEDs 33.

The reflection sheet 34 has a plurality of through holes 35. The through holes 35 correspond to the LEDs 33. The reflection sheet 34 covers the MCPCBs 32 with the LEDs 33 passing through the through holes 35 and protruding. A pair of side supporters 26 are coupled with the reflecting sheet 34, form a space to set up the backlight unit 30, and function to prevent light from leaking outward.

Light emitted from the LEDs 33 and reflecting on the reflection sheet 34 is diffused through the diffusion sheet 35 first, then becomes uniform plane light having high quality through the optical sheets 38, and then is supplied to the liquid crystal panel 10. The diffusion plate 36 has a thickness of about 1 to 4 mm (millimeters).

As size of the LCD device increases, size and weight of the diffusion plate 36 increases. This weight increase causes middle portion of the diffusion plate 36 to sag. Further, this is against recent trend of decreasing the weight of the LCD device.

SUMMARY

A backlight unit includes at least one light emitting diode; and a diffusion plate over the at least one light emitting diode and including at least one opening portion corresponding to the at least one light emitting diode.

In another aspect, a liquid crystal display device includes a liquid crystal panel; and a backlight unit supplying light to the liquid crystal panel, the backlight unit including: at least one light emitting diode; and a diffusion plate over the at least one light emitting diode and including at least one opening portion corresponding to the at least one light emitting diode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS

Exemplary embodiments may be better understood with reference to the drawings, but these examples are not intended to be of a limiting nature.

Figure 1:
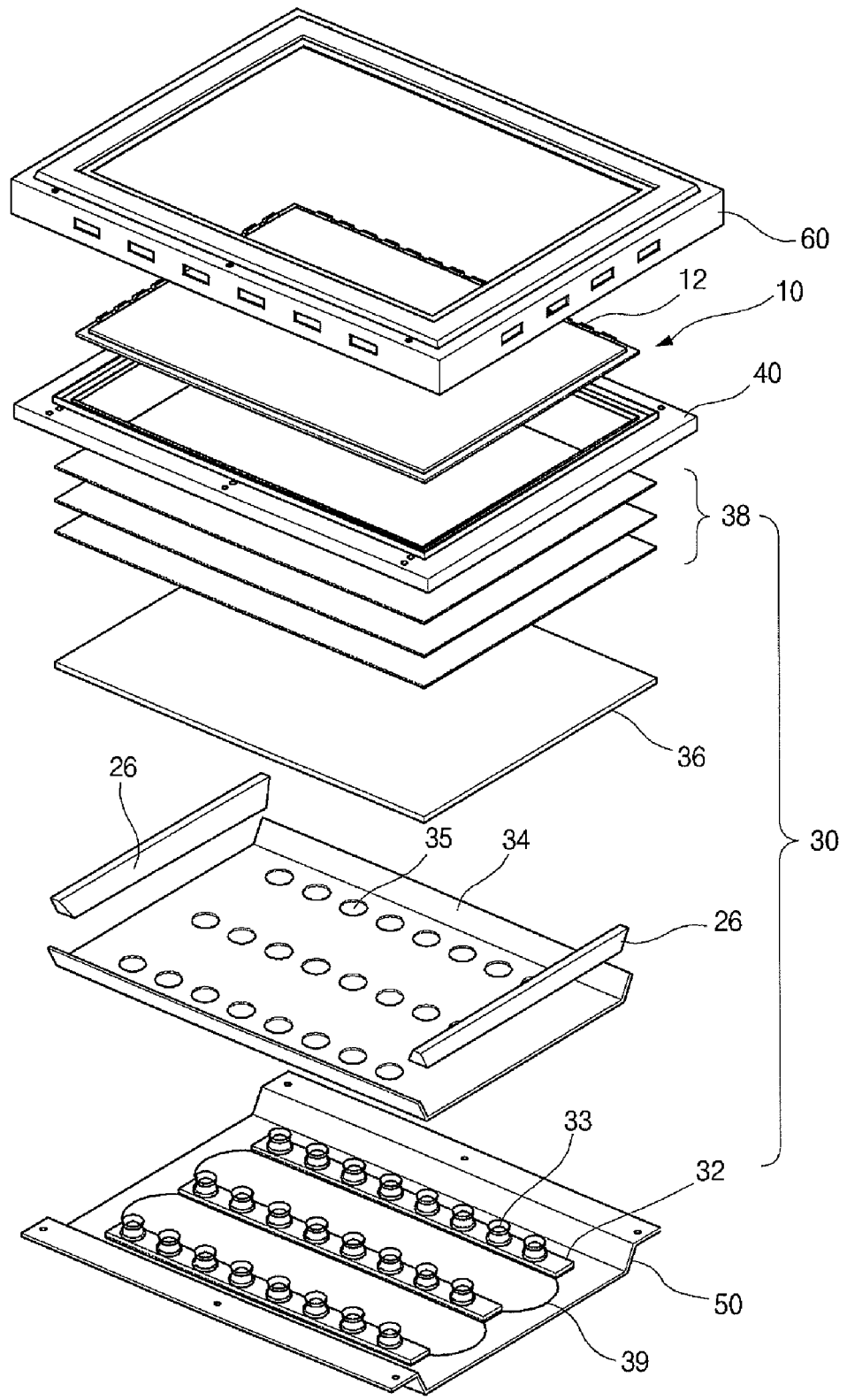
FIG. 1 is an exploded perspective view illustrating an LCD device according to the related art.
Figure 2:
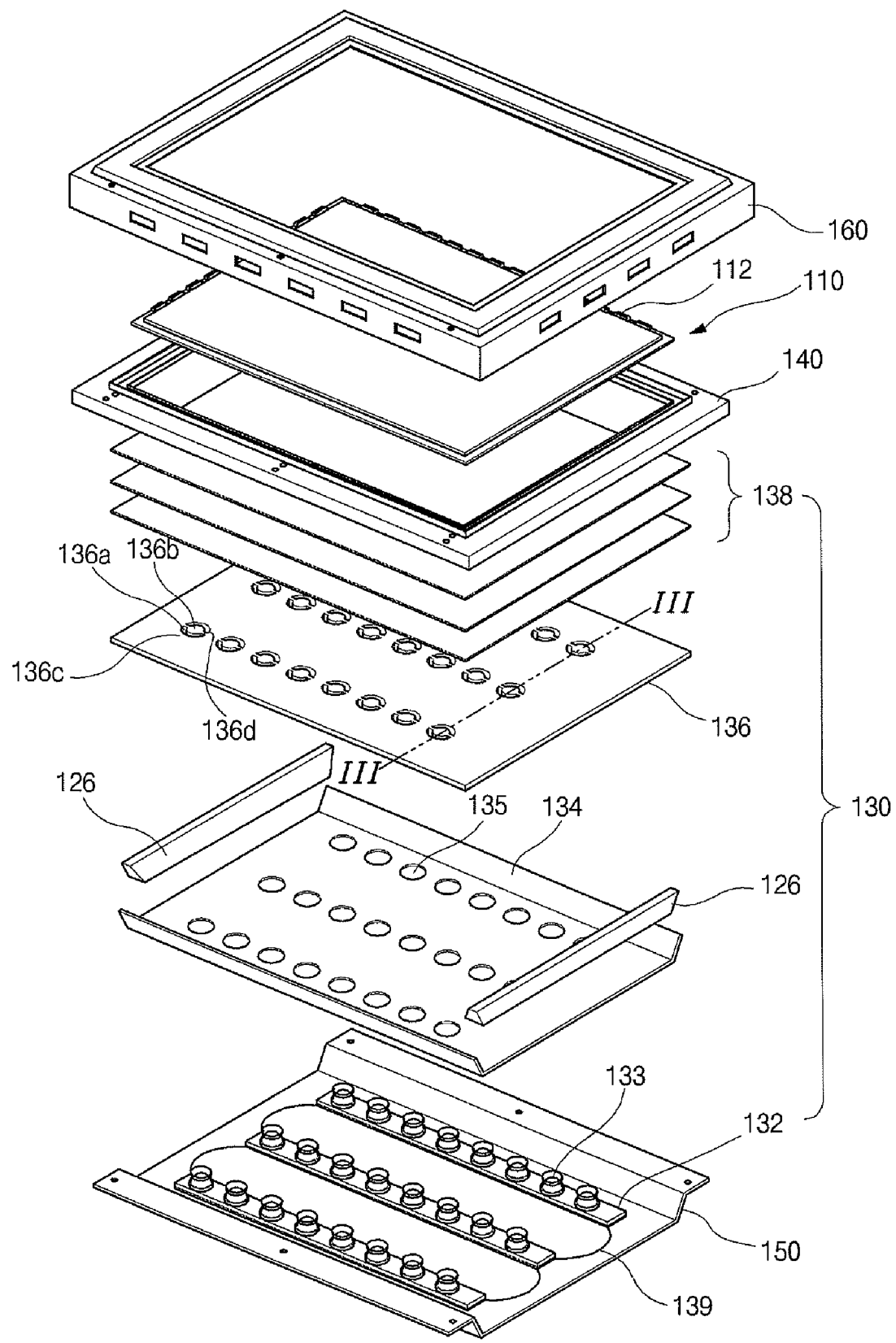
FIG. 2 is an exploded perspective view illustrating an LCD device according to a first embodiment.
Figure 3:
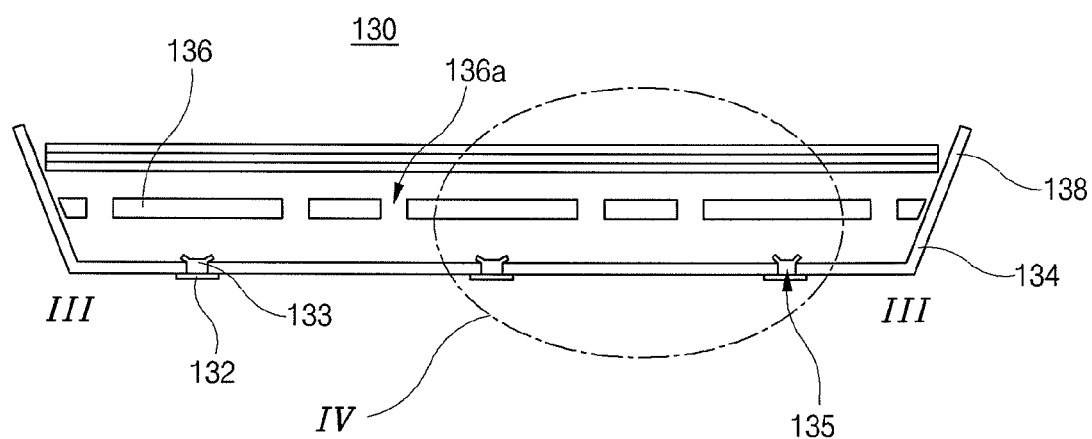
FIG. 3 is a cross-sectional view taken along a line III-III of FIG. 2.

FIG. 2 is an exploded perspective view illustrating an LCD device according to a first embodiment of the present invention, and FIG. 3 is a cross-sectional view taken along a line III-III of FIG. 2.

Referring to FIGS. 2 and 3, in the LCD device according to the first embodiment, a backlight unit 130 and a liquid crystal panel 110 are sequentially disposed over an inner surface of a bottom case 150.

A main supporter 140 has a rectangular frame shape and supports the backlight unit 130 and the liquid crystal panel 110. The main supporter 140 is combined with the bottom case 150.

A driving circuit is connected to the liquid crystal panel 110 through a FPC film. The top case 160 is disposed on a front surface of the liquid crystal panel 110. The top case 160 has a rectangular frame shape. The top case 160 presses and fixes a peripheral portion of the liquid crystal panel 110 and is combined with the main supporter 140 and the bottom case 150.

The backlight unit 130 includes a plurality of LEDs 133, a reflection sheet 134, a diffusion plate 136, and optical sheets 138 such as a prism sheet and a diffusion sheet. The LEDs 133 are arranged in a stripe pattern on a plurality of base PCBs 132, for example, MCPCBs 132. The MCPCBs 132 are arranged in parallel on the bottom case 150 and are connected through a conductive line 139 to be supplied with a power for the LEDs 133.

The reflection sheet 134 has a plurality of through holes 135. The through holes 135 correspond to the LEDs 133. The reflection sheet 134 covers the MCPCBs 32 and the bottom case 150 with the LEDs 133 passing through the through holes 135 and protruding. A pair of side supporters 126 are coupled with the reflection sheet 134, form a space to set up the backlight unit 30, and function to prevent light from leaking outward.

Light emitted from the LEDs 133 and reflecting on the reflection sheet 134 is diffused through the diffusion sheet 135 first, then becomes uniform plane light having high quality through the optical sheets 138, and then is supplied to the liquid crystal panel 110. The diffusion plate 136 may have a thickness of about 1 to 4 mm (millimeters).

The diffusion plate 136 may include a plurality of opening portions 136a corresponding to the plurality of LEDs 133. The diffusion plate 136 may further include a circular-shaped first portion 136b surrounded by and inside of the opening portion 136a, a second portion 136c surrounding and outside of the opening portion 136c, and a third portion 136d coupling the first and second portions 136b and 136c.

The opening portion 136a may have a disconnected ring shape by the third portion 136d and include at least one part. For example, the opening portion 136a includes two parts divided by the third portion 136d and each having a half ring shape. The opening portion 136a may have more than two parts divided by the third portion 136d. The opening portion 136a may have a disconnected shape different from the ring shape.

By forming the plurality of opening portions 136a, weight of the diffusion plate 136 can decrease more than that of the related art. Accordingly, sagging due to the weight of the diffusion plate 136 can be decreased, and also, the weight of the LCD device can be decreased.

If some of light emitted from the LEDs 133 directly passed through the opening portion 136a, non-uniform light would be supplied to the liquid crystal panel 110 and display quality would decrease. Accordingly, to diffuse or scatter all of light by passing through the diffusion plate, the opening portions 136a are arranged appropriately.

Figure 4:
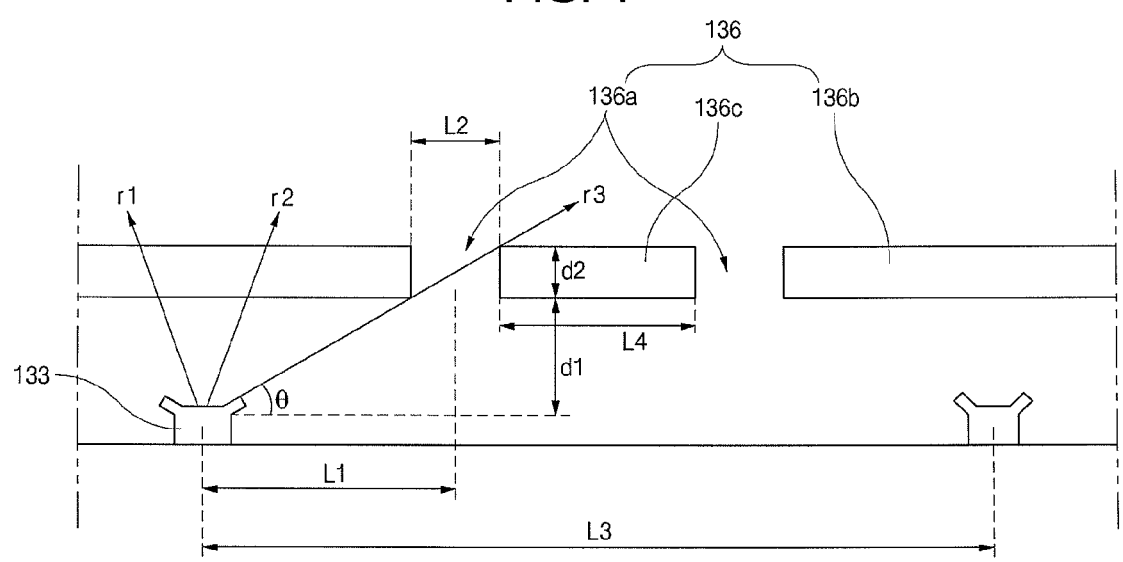
FIG. 4 is a cross-sectional view enlarging a region IV of FIG. 3.

FIG. 4 is a cross-sectional view enlarging a region IV of FIG. 3.

Referring to FIGS. 2 to 4, the diffusion plate 136 may include the opening portion 136a, and the first to third portions 136b to 136d. The LED 133 may correspond to a center of the first portion 136b.

A first distance L1 may be a distance between a center of the LED 133 and a center of the opening portion 136a. A second distance L2 may be a width of the opening portion 136a. A third distance d1 may be a distance between the LED 133 and the diffusion plate 136. A fourth distance d2 may be a thickness of the diffusion plate 136. The opening portion 136a may be arranged according to a first expression, $(d1+0.5*d2)/L1=d2/L2$.

When the LED 133 emits first to third lights r1 to r3 in different directions, the first to second lights r1 and r2 passes through the diffusion plate 136 and does not cause non-uniformity of light. For the third light r3 emitted from the LED 133 toward the opening portion 136a with an emission angle of θ with respect to a plane of the reflection sheet 134, the emission angle may be expressed according to a second expression, $\tan \theta = d2/L2$. If the third light r3 directly passed through the opening portion 136a due to position or width of the opening portion 136a, this would cause non-uniform light supplied to a liquid crystal panel 110 and display quality decrease. To prevent this, in the first embodiment, the opening portion 136a is arranged according to the first expression. In other words, for the third light r3 according to the second expression, when the opening portion 136a has the width of the second distance L2 according to the first expression, the third light r3 does not directly pass through the opening portion 136a but passes through the diffusion plate 136. Accordingly, all rays of light emitted from the LED 133 pass through the diffusion plate 136 and are supplied to the liquid crystal panel 110.

The first distance L1 may be determined according to arrangement of the LEDs 133. For example, when a fifth distance L3 is a distance between adjacent two LEDs 133, the first distance L1 may be less than a half of the fifth distance L3 to form adjacent two opening portions 136a corresponding to the adjacent two LEDs 133, respectively. When the third and fourth distances d1 and d2 are determined, based upon the first expression, as the first distance L1 increases, the second distance L2 increases, and thus weight of the diffusion plate 136 decreases. Accordingly, it may be desired that the first distance L1 is maximized within the extent that the adjacent two opening portions 136a are not coupled and the second portion 136c exists therebetween. The second portion 136c between the adjacent opening portions 136 has a width of a sixth distance L4 not to have deformation such as sag.

Accordingly, the first distance L1 may be determined to have a range according to a third expression, $L1 < (L3-L4)/2 < L3/2$.

As described in the first embodiment, the backlight unit includes the LEDs arranged in stripe pattern and the diffusion plate including the opening portions corresponding to the LEDs. Accordingly, because of the opening portions, the weight of the diffusion plate decreases, and thus sagging of the diffusion plate can be prevented, and the weight of the LCD device can be decreased.

Figure 5:
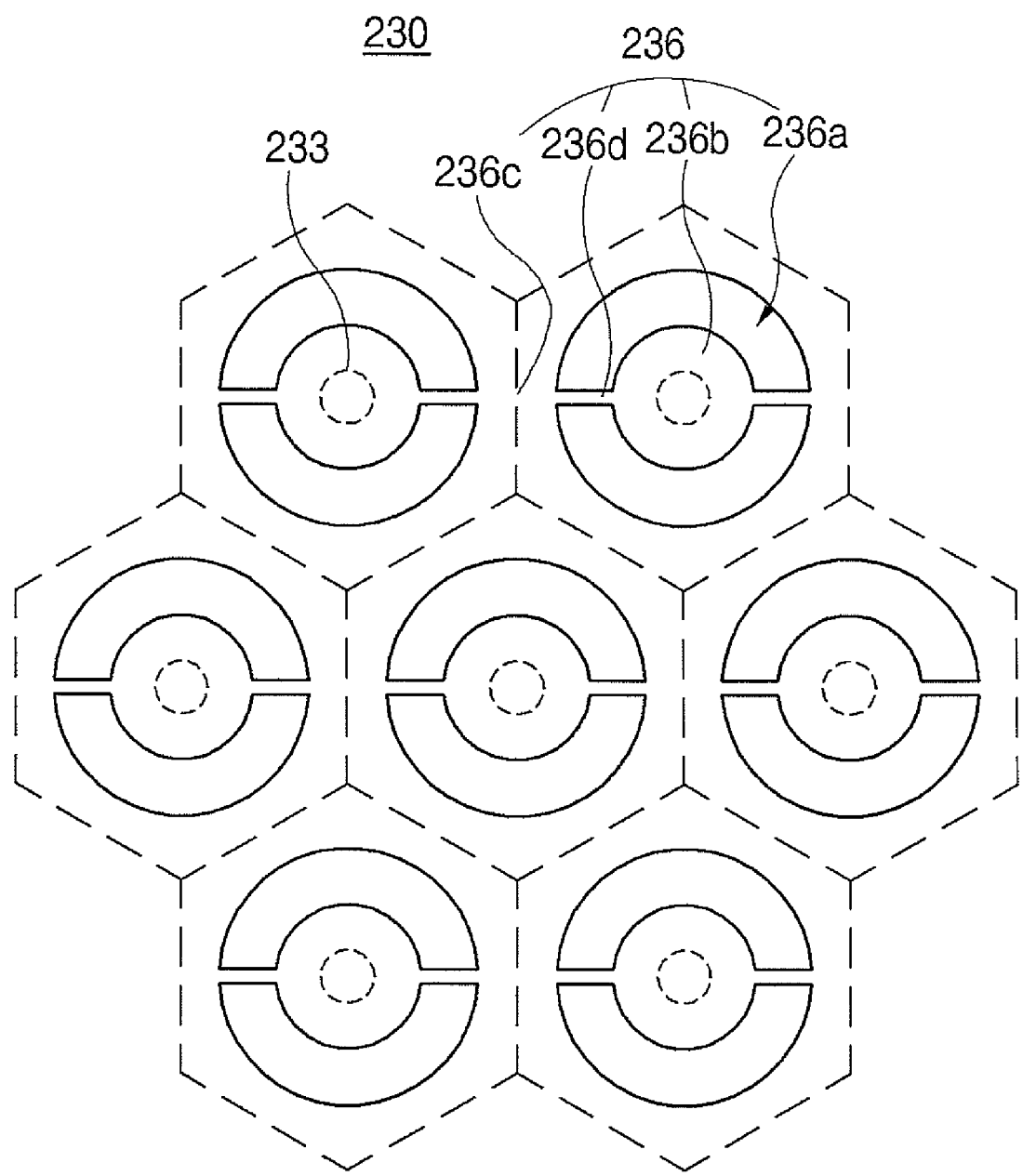
FIG. 5 is a plan view illustrating a backlight unit according to a second embodiment.

FIG. 5 is a plan view illustrating a backlight unit according to a second embodiment. A backlight unit 230 of FIG. 5 is simplified in brevity of explanation. Explanations of parts similar to parts of the first embodiment may be omitted.

Referring to FIG. 5, a diffusion plate 236 may include a plurality of opening portions 236a corresponding to a plurality of LEDs 233. The diffusion plate 236 may further include a first portion 236a directly above the LED 233, a second portion 236c surrounding the opening portion 236a, and a third portion 236d coupling the first and second portions 236b and 236c.

The LEDs 233 may be arranged in honeycomb pattern. For example, each LED 233 corresponds to a center of each hexagon of the honeycomb pattern. Accordingly, the opening portion 236 may be arranged to correspond to each hexagon of the honeycomb pattern. The honeycomb pattern can maximize space efficiency. Accordingly, when the LEDs 233 and the opening portions 236a are arranged in honeycomb pattern, a number of the opening portions 236 per unit area can maximized, and uniformity of light can be increased. Even though not shown in the drawing, in the second embodiment, arrangement relationship of the LED 233 and the opening portion according to the first to third expressions of the first embodiment may be employed, and the first distance may be determined within the extent that the second portion 236c does not have deformation.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
   at least one light emitting diode; and
   a diffusion plate over the at least one light emitting diode and including at least one opening portion corresponding to the at least one light emitting diode,
   wherein the at least one opening portion has a disconnected ring shape, and the diffusion plate further includes a first portion directly above the at least one light emitting diode and surrounded by the at least one opening portion, a second portion surrounding the at least one opening portion, and a third portion coupling the first and second portions.

2. The backlight unit according to claim 1, wherein a first distance L1 is an arithmetic mean of inner and outer radii of the at least one opening portion having the disconnected ring shape, a second distance of a width of the at least one opening portion is L2, a third distance between the at least one light emitting diode and the diffusion plate is d1, and a fourth distance of a thickness of the diffusion plate is d2, and wherein a relationship of the first to fourth distances is $(d1+0.5*d2)/L1=d2/L2$.

3. The backlight unit according to claim 2, wherein the at least one light emitting diode is a plurality of light emitting diodes and the at least one opening portion is a plurality of opening portions, wherein a fifth distance between adjacent two of the plurality of light emitting diodes is L3, and a sixth distance between adjacent two of the plurality of opening portions is L4, and wherein a relationship of the first, fifth and sixth $L1<(L3-L4)/2<L3/2$.

4. The backlight unit according to claim 1, wherein the at least one light emitting diode is a plurality of light emitting diodes and the at least one opening portion is a plurality of opening portions, wherein the plurality of light emitting diodes are arranged in honeycomb pattern, and a respective light emitting diode corresponds to a center of a respective hexagon of the honeycomb pattern.

5. The backlight unit according to claim 1, further comprising a metal core printed circuit board which the at least one light emitting diode is coupled with, a reflection sheet including at least one through hole which the at least one light emitting diode passes through, and at least one optical sheet over the diffusion plate.

6. A liquid crystal display device, comprising:
   a liquid crystal panel; and
   a backlight unit supplying light to the liquid crystal panel, the backlight unit including:
   at least one light emitting diode; and
   a diffusion plate over the at least one light emitting diode and including at least one opening portion corresponding to the at least one light emitting diode,
   wherein the at least one opening portion has a disconnected ring shape, and the diffusion plate further includes a first portion directly above the at least one light emitting diode and surrounded by the at least one opening portion, a second portion surrounding the at least one opening portion, and a third portion coupling the first and second portions.

7. The device according to claim 6, wherein a first distance L1 is an arithmetic mean of inner and outer radii of the at least one opening portion having the disconnected ring shape, a second distance of a width of the at least one opening portion is L2, a third distance between the at least one light emitting diode and the diffusion plate is d1, and a fourth distance of a thickness of the diffusion plate is d2, and wherein a relationship of the first to fourth distances is $(d1+0.5*d2)/L1=d2/L2$.

8. The device according to claim 7, wherein the at least one light emitting diode is a plurality of light emitting diodes and the at least one opening portion is a plurality of opening portions, wherein a fifth distance between adjacent two of the plurality of light emitting diodes is L3, and a sixth distance between adjacent two of the plurality of opening portions is L4, and wherein a relationship of the first, fifth and sixth $L1<(L3-L4)/2<L3/2$.

9. The device according to claim 6, wherein the at least one light emitting diode is a plurality of light emitting diodes and the at least one opening portion is a plurality of opening portions, wherein the plurality of light emitting diodes are arranged in honeycomb pattern, and a respective light emitting diode corresponds to a center of a respective hexagon of the honeycomb pattern.

10. The device according to claim 6, further comprising a metal core printed circuit board which the at least one light emitting diode is coupled with, a reflection sheet including at least one through hole which the at least one light emitting diode passes through, and at least one optical sheet over the diffusion plate.

* * * * *

UNITED STATES PATENT AND TRADEMARK OFFICE
CERTIFICATE OF CORRECTION

PATENT NO. : 7,768,592 B2  
APPLICATION NO. : 11/967656  
DATED : August 3, 2010  
INVENTOR(S) : Hyung Ki Hong Page 1 of 1

It is certified that error appears in the above-identified patent and that said Letters Patent is hereby corrected as shown below:

In the Claims

In column 6, claim 8, line 41, after "of the first, fifth and sixth" insert --distances is--.

Signed and Sealed this
Eighth Day of February, 2011

David J. Kappos
*Director of the United States Patent and Trademark Office*